US009374022B2

(12) United States Patent
Takamatsu et al.

(10) Patent No.: US 9,374,022 B2
(45) Date of Patent: Jun. 21, 2016

(54) CONTROL APPARATUS AND CONTROL METHOD FOR VOLTAGE CONVERSION APPARATUS

(75) Inventors: Naoyoshi Takamatsu, Sunto-gun (JP); Masaki Okamura, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 90 days.

(21) Appl. No.: 14/348,834

(22) PCT Filed: Oct. 7, 2011

(86) PCT No.: PCT/JP2011/073216
§ 371 (c)(1),
(2), (4) Date: Jun. 9, 2014

(87) PCT Pub. No.: WO2013/051152
PCT Pub. Date: Apr. 11, 2013

(65) Prior Publication Data
US 2014/0321182 A1    Oct. 30, 2014

(51) Int. Cl.
*H02M 7/5387* (2007.01)
*H02M 7/539* (2006.01)
(Continued)

(52) U.S. Cl.
CPC .............. *H02M 7/539* (2013.01); *B60L 7/14* (2013.01); *B60L 11/005* (2013.01); *B60L 11/123* (2013.01); *B60L 11/14* (2013.01); *B60L 15/007* (2013.01); *B60L 15/2009* (2013.01); *H02M 1/083* (2013.01); *H02M 1/38* (2013.01); *B60L 2210/10* (2013.01); *B60L 2210/40* (2013.01); *B60L 2220/14* (2013.01); *B60L 2240/421* (2013.01);
(Continued)

(58) Field of Classification Search
CPC .............. H02M 5/458; H02M 7/5387; H02M 7/53871; H02M 7/53875
USPC .................. 363/71, 95, 98, 124, 131, 132
See application file for complete search history.

(56) References Cited

U.S. PATENT DOCUMENTS 7,594,491 B2 *  9/2009  Yanagida ................ F02N 11/04
                                                123/179.28
8,643,316 B2 *  2/2014  Kono ...................... B60L 3/0023
                                                318/139
(Continued)

FOREIGN PATENT DOCUMENTS

CN    101454964 A    6/2009
CN    101755219 A    6/2010
(Continued)

*Primary Examiner* — Gary L Laxton
(74) *Attorney, Agent, or Firm* — Kenyon & Kenyon LLP

(57) ABSTRACT

A control apparatus for a voltage conversion apparatus includes: duty command signal generation means for generating a duty command signal corresponding to a duty ratio of switching elements carrier signal generation means for generating carrier signals corresponding to respective switching frequencies of the switching elements; switching control signal generation means for generating respective switching control signals of switching ON and OFF states of the switching elements, by comparing the duty command signal with the carrier signals; one arm driving control means for implementing one arm driving by alternatively turning on the first and second switching elements; and phase inverting means for bringing phases of portions, of the carrier signals, corresponding to switching at least right after arm switching, into a state where the phases are shifted from each other by 180 degrees between the first and second switching elements, at the time of the arm switching.

5 Claims, 7 Drawing Sheets

(51) Int. Cl.
  *H02M 1/38* (2007.01)
  *B60L 7/14* (2006.01)
  *B60L 11/12* (2006.01)
  *B60L 11/14* (2006.01)
  *B60L 15/20* (2006.01)
  *B60L 11/00* (2006.01)
  *B60L 15/00* (2006.01)
  *H02M 1/08* (2006.01)

(52) U.S. Cl.
  CPC ...... *B60L 2240/423* (2013.01); *B60L 2240/527* (2013.01); *B60L 2240/547* (2013.01); *B60L 2240/549* (2013.01); *Y02T 10/6217* (2013.01); *Y02T 10/645* (2013.01); *Y02T 10/7022* (2013.01); *Y02T 10/7077* (2013.01); *Y02T 10/7216* (2013.01); *Y02T 10/7241* (2013.01); *Y02T 10/7275* (2013.01)

(56) References Cited

U.S. PATENT DOCUMENTS

| | | | |
|---|---|---|---|
| 2009/0121659 A1* | 5/2009 | Oyobe | B60K 6/445 318/12 |
| 2009/0302818 A1 | 12/2009 | Okamura et al. | |
| 2010/0188106 A1 | 7/2010 | Ahn | |
| 2012/0049774 A1 | 3/2012 | Takamatsu et al. | |
| 2012/0081045 A1 | 4/2012 | Takamatsu et al. | |

FOREIGN PATENT DOCUMENTS

| | | |
|---|---|---|
| JP | 2010283931 A | 12/2010 |
| WO | 2010137127 A1 | 12/2010 |
| WO | 2010140212 A1 | 12/2010 |

* cited by examiner

CONTROL APPARATUS AND CONTROL METHOD FOR VOLTAGE CONVERSION APPARATUS

CROSS-REFERENCE TO RELATED APPLICATIONS

This is a national phase application based on the PCT International Patent Application No. PCT/JP2011/073216 filed on Oct. 7, 2011, the entire contents of which is incorporated herein by reference.

TECHNICAL FIELD

The invention relates to a technical field of a control apparatus and a control method for a voltage conversion apparatus mounted on, for example, a vehicle.

BACKGROUND ART

Recently, an electrically driven vehicle that is mounted with a power storage apparatus (for example, a secondary battery and a capacitor), and travels by using driving force generated from electric power stored in the power storage apparatus is attracting attention as an environmentally-friendly vehicle. Examples of such an electrically driven vehicle include an electric automobile, a hybrid automobile, a fuel-cell vehicle, and the like.

These electrically driven vehicles each sometimes include a motor generator for receiving electric power from the power storage apparatus to generate driving force for traveling at the time of starting or acceleration, and generating power by regenerative braking at the time of braking to store electric energy in the power storage apparatus. Thus, the electrically driven vehicle is mounted with an inverter to control a motor generator in accordance with a traveling state.

Such a vehicle sometimes includes a voltage conversion apparatus (converter) between the power storage apparatus and the inverter to stably supply electric power utilized by the inverter that varies depending on a vehicle state. The input voltage of the inverter is made higher than the output voltage of the power storage apparatus by this converter, thereby enabling high output of a motor. Additionally, a motor current is reduced at the time of the same output, thereby enabling downsizing of the inverter and the motor, and reduction in cost.

In order to further improve the fuel efficiency of the electrically driven vehicle, it is important to reduce the loss of the converter to improve efficiency.

For example, in Patent Document 1, there is proposed a technology of switching a step-up converter by one arm in an area where load power is small. According to such a technology, it is possible to reduce the loss of the converter by a reduced current ripple.

Additionally, for example, in Patent Document 2, there is proposed a technology of fixing an auxiliary switching element and a main switching element to be in an ON-state with one arm, and then turning on or off a main switching element on the other side according to a duty ratio, in a case where the duty ratio becomes higher than a predetermined value.

Patent Document 1: WO 2010/137127
Patent Document 2: Japanese Patent Application Publication No. 2010-283931

SUMMARY OF THE INVENTION

According to the driving that uses only one arm in the converter (hereinafter, suitably referred to as "one arm driving"), described above, it is possible to prevent reduction of a maximum step-up ratio of the converter, resulting from dead time (i.e., a period during which both switching elements corresponding upper and lower arms are turned off) used for preventing the short circuit of the switching elements, for example.

However, for example, in a case where load power suddenly changes as in automotive use a battery current suddenly changes, and ON signals of the switching elements sometimes come close at the time of the switching of the upper and lower arms. At this time, in the switching elements, a delay occurs in the turning-on/off of an actual current from the reception of a signal for switching the turning-on/off. Therefore, there is a technological problem that the switching elements may be short-circuited to each other due to the timing delay of the switching of the switching elements, when the ON signals of the switching elements in the upper and lower arms come close to each other.

The invention has been conceived to solve the aforementioned problem, and an object of the invention is to provide a control apparatus and a control method for a voltage conversion apparatus that are capable of preventing the short circuit of the switching elements in the upper and lower arms without reducing a step-up ratio in the voltage conversion apparatus.

In order to solve the aforementioned problem, a control apparatus for a voltage conversion apparatus of the invention is a control apparatus for a voltage conversion apparatus including a first switching element and a second switching element connected in series with each other, and includes: duty command signal generation means for generating a duty command signal corresponding to a duty ratio of the first switching element and the second switching element; carrier signal generation means for generating carrier signals corresponding to respective switching frequencies of the first switching element and the second switching element; switching control signal generation means for generating respective switching control signals of switching ON and OFF states of the first switching element and ON and OFF states of the second switching element, by comparing the duty command signal with the carrier signals; one arm driving control means for implementing one arm driving only by any one of a first arm including the first switching element and a second arm including the second switching element, by controlling the switching control signal generation means such that the first switching element and the second switching element are alternatively turned on; and phase inverting means for bringing phases of portions, of the carrier signals, corresponding to switching of the first switching element or the second switching element at least right after arm switching, into a state where the phases are shifted from each other by 180 degrees between the first switching element and the second switching element, at the time of the arm switching of mutually switching between one arm driving by the first arm and one arm driving by the second arm.

The voltage conversion apparatus according to the invention is a converter mounted in, for example, a vehicle, and includes the first switching element and the second switching element connected in series with each other. As the first switching element and the second switching element, for example, insulated gate bipolar transistors (IGBTs), metal oxide semiconductor (MOS) transistors for electric power, or bipolar transistors for electric power can be used.

To the first switching element and the second switching element, for example, respective diodes are connected in parallel, and the first switching element and the second switching element form a first arm and a second arm, respectively. That is, the first switching element forms the first arm, and can switch the turning-on/off of the driving of the first arm by switching operation. Similarly, the second switching element forms the second arm, and can switch the turning-on/off of the driving of the second arm by the switching operation.

The voltage conversion apparatus includes a reactor, a smoothing capacitor, and the like, in addition to the aforementioned units.

The control apparatus for a voltage conversion apparatus according to the invention is an apparatus that controls the operation of the aforementioned voltage conversion apparatus, and can take the form of various processing units such as a single or a plurality of electronic controlled units (ECUs), various controllers, or various computer systems such as microcomputer devices, which can properly include one or a plurality of central processing units (CPUs), micro processing units (MPUs), various processors, or various controllers, or further properly include various storage means such as a read only memory (ROM), a random access memory (RAM), a buffer memory, and flash memory, or the like, for example.

At the time of the operation of the control apparatus for a voltage conversion apparatus according to the invention, the duty command signal generation means generates the duty command signal corresponding to the duty ratio of the first switching element and the second switching element. The duty command signal is determined on the basis of, for example, a voltage value and a current value to be output.

Additionally, at the time of the operation of the control apparatus for a voltage conversion apparatus according to the invention, the carrier signal generation means generates the carrier signals corresponding to respective switching frequencies of the first switching element and the second switching element. The carrier signals are generated as signals that have preset frequencies. As described later, the first switching element and the second switching element are driven by using the respective carrier signals that are different from each other.

The switching control signal generation means compares the duty command signal with the carrier signal. As a result, the respective switching control signals of switching the ON and OFF states of the first switching element and the ON and OFF states of the second switching element are generated by the switching control signal generation means. The switching control signals are supplied to the first switching element and the second switching element. Consequently, the drive of the first and second arms of the voltage conversion apparatus is controlled.

The aforementioned switching control signal generation means are sometimes controlled by the one arm driving control means such that the first switching element and the second switching element are alternatively turned on. With such control, the one arm driving only by any one of the first arm including the first switching element and the second arm including the second switching element is implemented.

The one arm driving control means determines, on the basis of, for example, a voltage value to be output, a current value to be output, or the like, which are should be used to perform the one arm driving, among the first arm and the second arm, when the first arm including the first switching element or the second arm including the second switching element is selected. More specifically, for example, the one arm driving control means performs one arm driving by the first arm in a case where a motor generator connected to the voltage conversion apparatus performs regenerative operation, and the one arm driving control means performs one arm driving by the second arm in a case where the motor generator performs powering operation. Thus, the one arm driving control means controls so as to properly switch between the one arm driving by the first arm and the one arm driving by the second arm.

In the invention, particularly, at the time of the arm switching of mutually switching between the one arm driving by the first arm and the one arm driving by the second arm, the phases of the carrier signals are shifted from each other by 180 degrees (i.e., only one of them is inverted) between the first switching element and the second switching element by the phase inverting means. More specifically, the phase inverting means inverts the phases of the portions, of the carrier signals, corresponding to the switching of the first switching element and the second switching element at least right after the arm switching. That is, the carrier signal corresponding to the first switching element and the carrier signal corresponding to the second switching element are inverted in phase from each other at least right after the arm switching.

As described above, when the phase of the carrier signal is inverted, a difference is generated in the timing of the switching of the first switching element and the second switching element, by a half cycle of the carrier signal. In other words, a period of a half cycle of the carrier signal can be secured as a period from when one of the first switching element and the second switching element is turned off to when the other is turned on.

When the period from when one of the first switching element and the second switching element is turned off to when the other is turned on is shortened (i.e., the timing of the switching of the first switching element and the timing of the switching of the second switching element come close to each other), the first switching element and the second switching element may be short-circuited. Particularly, in a switching element configured as a semiconductor device, a delay occurs in the turning-on/off of an actual current from the reception of the switching control signal, and therefore a high risk for short circuit exists.

As a method of preventing the short circuit described above, a method of providing dead time is considered. However, in this case, a maximum step-up ratio in the voltage conversion apparatus is restricted by the dead time. Particularly, in a case where the driving frequency is made high, the influence of the dead time on the maximum step-up ratio is also increased.

Accordingly, in the invention, as described above, a period of a half cycle of the carrier signal can be secured as the period from when one of the first switching element and the second switching element is turned off to when the other is turned on, by inverting the phase of the carrier signal. Accordingly, it is possible to suitably prevent the short circuit of the first switching element and the second switching element.

The respective carrier signals corresponding to the first switching element and the second switching element are desirably inverted in phase as described above (i.e., the phases are shifted from each other by 180 degrees). However, even in a state where the phase is not completely inverted (i.e., the phases are not exactly shifted by 180 degrees), an adequate effect is obtained. Specifically, for example, even in a state the phases are shifted from each other by 175 degrees or 185 degrees, the timing of the switching of the first switching element and the timing of the switching of the second switching element are shifted from each other, and therefore the aforementioned effect is adequately exerted. That is, the "180 degrees" according to the invention may be set to include some margin.

As described above, according to the control apparatus for a voltage conversion apparatus according to the invention, it is possible to prevent the short circuit of the switching elements in the upper and lower arms without reducing a step-up ratio in the voltage conversion apparatus.

According to an aspect of the control apparatus for a voltage conversion apparatus of the invention, the phase inverting means brings the phases of the carrier signals into a state where the phases of the carrier signals are always shifted from each other by 180 degrees between the first switching element and the second switching element.

According to this aspect, the phases of the carrier signals corresponding to the first switching element and the second switching element are always shifted from each other by 180 degrees, and therefore the whole process can be simplified compared to a case where the phases are shifted only at the time of arm switching. Specifically, a process of shifting the phases by 180 degrees, or returning the phases to an unshifted state, a process of determining whether or not the phases should be shifted, or the like can be omitted, and therefore the whole process can be simplified.

In a case where a state where the carrier signals are shifted by 180 degrees is returned to an unshifted state, the length of the switching control signal corresponding to the first switching element or the second switching element is temporarily shortened. In this case, the maximum step-up ratio in the voltage conversion apparatus may be temporarily reduced. In this aspect, it is possible to prevent such a defect.

According to another aspect of the control apparatus for a voltage conversion apparatus of the invention, the control apparatus includes: dead time addition means for adding dead time during which both the first switching element and the second switching element are turned off, to the switching control signals; and dead time addition control means for controlling the dead time addition means such that the dead time is added to only switching of the first switching element or the second switching element right after the arm switching.

According to this aspect, the dead time addition means adds the dead time to the switching control signals. Particularly, the dead time addition control means adds the dead time only to the switching of the first switching element or the second switching element right after the arm switching. That is, the dead time is added not to all switching control, but to only switching control that may cause the short circuit of the switching elements.

The dead time has an effect of preventing short circuit as described above, but also has an effect of reducing a maximum step-up ratio in the conversion apparatus. Therefore, it is possible to more effectively prevent short circuit by adding the dead time only at the timing of preventing short circuit.

According to yet another aspect of the control apparatus for a voltage conversion apparatus of the invention, the control apparatus includes: dead time adjustment means for adjusting a length of the dead time added by the dead time addition means, on the basis of the duty ratio of the first switching element and the second switching element.

According to this aspect, the dead time, adjustment means suitably adjusts the length of the added dead time. Specifically, the dead time adjustment means adjusts the length of the dead time on the basis of the duty ratio of the first switching element and the second switching element. The "duty ratio of the first switching element and the second switching element" mentioned herein includes not only a value showing the duty ratio itself, but also various parameters for determining the duty ratio. Accordingly, the length of the dead time may be adjusted on the basis of, for example, a voltage value and a current value to be output.

The longer the dead time is, the more reliably the short circuit of the switching elements can be prevented. On the other hand, the shorter the dead time is, the more greatly the reduction of the maximum step-up ratio in the voltage conversion apparatus can be suppressed. Accordingly, as described above, by proper adjustment of the length of the dead time, it is possible to suitably suppress the reduction of the maximum step-up ratio in the voltage conversion apparatus while reliably preventing the short circuit of the switching elements.

In order to solve the aforementioned problem, a control method for a voltage conversion apparatus is a control method for a voltage conversion apparatus including a first switching element and a second switching element connected in series with each other, and includes: a duty command signal generation step of generating a duty command signal corresponding to a duty ratio of the first switching element and the second switching element; a carrier signal generation step of generating carrier signals corresponding to respective switching frequencies of the first switching element and the second switching element; a switching control signal generation step of generating respective switching control signals of switching ON and OFF states of the first switching element and ON and OFF states of the second switching element, by comparing the duty command signal with the carrier signals; a one arm driving control step of implementing one arm driving only by any one of a first arm including the first switching element and a second arm including the second switching element, by controlling the switching control signal generation step such that the first switching element and the second switching element are alternatively turned on; and a phase inverting step of bringing phases of portions, of the carrier signals, corresponding to switching of the first switching element or the second switching element at least right after arm switching, into a state where the phases are shifted from each other by 180 degrees between the first switching element and the second switching element, at the time of the arm switching of mutually switching between one arm driving by the first arm and one arm driving by the second arm.

According to the control method for a voltage conversion apparatus of the invention, similarly to the aforementioned control apparatus for a voltage conversion apparatus of the invention, the phases of the carrier signals corresponding to the first switching element and the second switching element are shifted from each other by 180 degrees, and therefore a period of a half cycle of the carrier signal can be secured as a period from when one of the first switching element and the second switching element is turned off to when the other is turned on. Accordingly, it is possible to prevent the short circuits of the switching elements in the upper and lower arms without reducing a step-up ratio in the voltage conversion apparatus.

The above-described various aspects of the control apparatus for a voltage conversion apparatus of the invention are applicable also to the control method for a voltage conversion apparatus of the invention.

The effects and other advantages of the invention will become more apparent from the modes for carrying out the invention, described below.

MODES FOR CARRYING OUT THE INVENTION

Hereinafter, embodiments of the invention will be described with reference to the drawings.

First Embodiment

Figure 1:
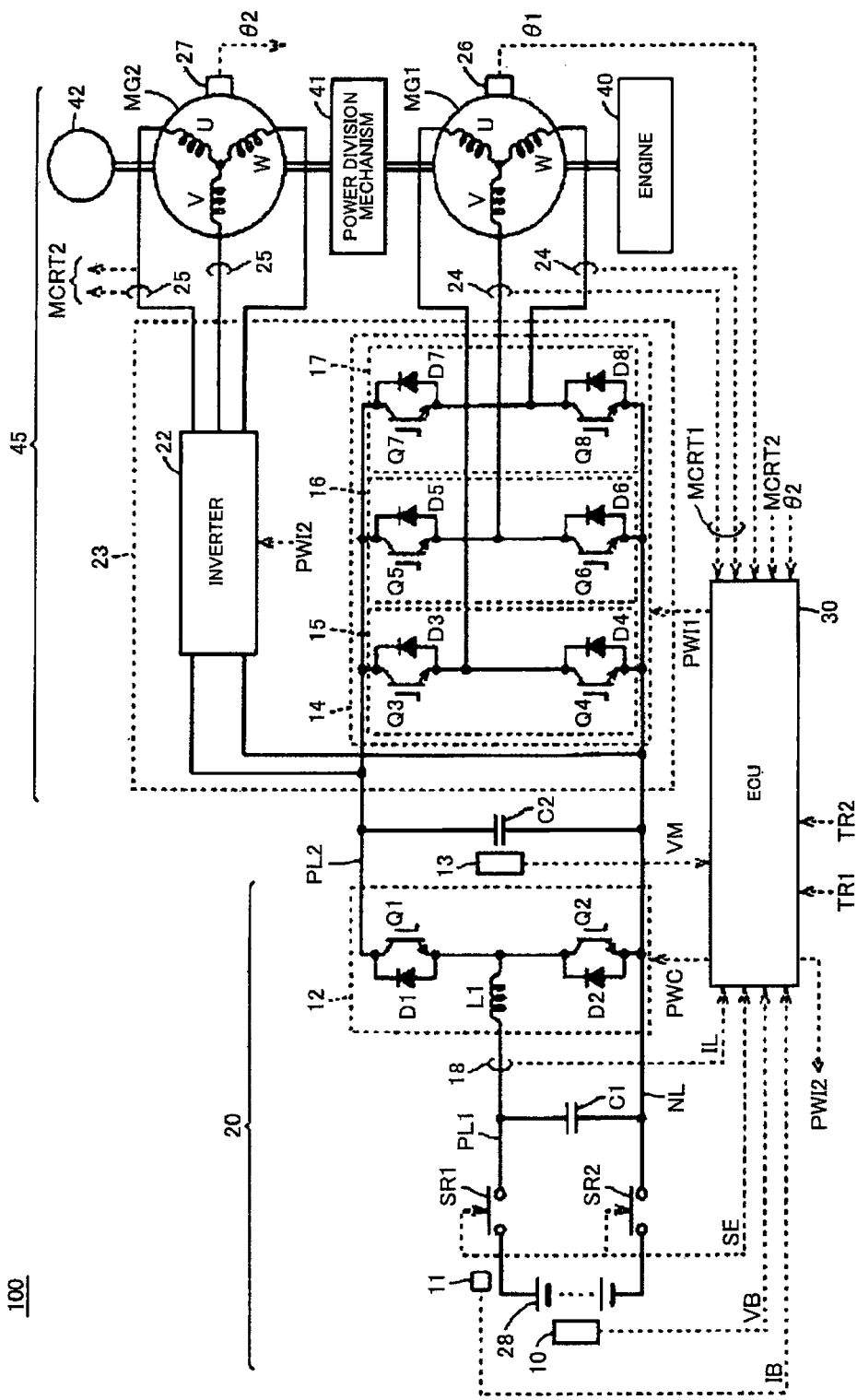
FIG. 1 is a schematic diagram showing a whole configuration of a vehicle mounted with a control apparatus for a voltage conversion apparatus according to a first embodiment.

First, a whole configuration of a vehicle mounted with a control apparatus for a voltage conversion apparatus according to a first embodiment described with reference to FIG. 1. FIG. 1 is a schematic diagram of the whole configuration of the vehicle mounted with the control apparatus for a voltage conversion apparatus according to the first embodiment.

In FIG. 1, a vehicle 100 mounted with the control apparatus for a voltage conversion apparatus according to the first embodiment is configured as a hybrid vehicle that employs an engine 40, and motor generators MG1 and MG2 as a power source. However, the configuration of the vehicle 100 is not limited to this, and is applicable to a vehicle capable of traveling by electric power from a power storage apparatus (for example, an electric automobile, or a fuel-cell automobile), or the like. The control apparatus for a voltage conversion apparatus is mounted in the vehicle 100 in this embodiment, but may be applicable to any apparatus that is driven by an alternating current (AC) motor, other than the vehicle.

The vehicle 100 includes a direct current (DC) voltage generation unit 20, a loading apparatus 45, a smoothing capacitor C2, and an ECU 30.

The DC voltage generation unit 20 includes a power storage apparatus 28, system relays SR1 and SR2, a smoothing capacitor C1 and a converter 12.

The power storage apparatus 28 includes a secondary battery of, for example, nickel hydride and lithium ion, and a power storage apparatus such as an electric double-layered capacitor. A DC voltage VB output by the power storage apparatus 28 and an input/output DC current IB are detected by a voltage sensor 10, and a current sensor 11, respectively. Then, the voltage sensor 10 and the current sensor 11 output respective detection values of the detected DC voltage VB and DC current IB to the ECU 30.

The system relay SR1 is connected between a positive electrode terminal of the power storage apparatus 28 and a power line PL1, and the system relay SR2 is connected between a negative electrode terminal of the power storage apparatus 28 and an earth wire NL. The system relays SR1 and SR2 are controlled by a signal SE from the ECU 30, and switch the supply and the interruption of the electric power from the power storage apparatus 28 to the converter 12.

The converter 12 is an example of a "voltage conversion apparatus" in the invention, and includes a reactor L1, switching elements Q1 and Q2, and diodes D1 and D2. The switching elements Q1 and Q2 are an example of a "first switching element" and a "second switching element" in the invention, respectively, and connected in series between a power line PL2 and the earth wire NL. The switching elements Q1 and Q2 are controlled by a switching control signal PWC from the ECU 30.

As the switching elements Q1 and Q2, for example, IGBTs, MOS transistors for electric power, or bipolar transistors for electric power can be used. In the switching elements Q1 and Q2, the antiparallel diodes D1 and D2 are arranged. The reactor L1 is provided between a connection node of the switching elements Q1 and Q2, and the power line PL1. The smoothing capacitor C2 is connected between the power line PL2 and the earth wire NL.

A current sensor 18 detects a reactor current that flows through the reactor L1, to output a detection value IL of the reactor current to the ECU 30.

The loading apparatus 45 includes an inverter 23, the motor generators MG1 and MG2, the engine 40, a power division mechanism 41, and driving wheels 42. The inverter 23 includes an inverter 14 for driving the motor generator MG1, and an inverter 22 for driving the motor generator. MG2. As in FIG. 1, it is not essential to provide two pairs of the inverter and the motor generator. For example, a configuration of providing either a pair of the inverter 14 and the motor generator MG1, or a pair of the inverter 22 and the motor generator MG2 may be employed.

The motor generators MG1 and MG2 receive AC power supplied from the inverter 23, to generate rotary driving force for vehicle propulsion. Additionally, the motor generators MG1 and MG2 receive rotational force from the outside, to generate AC power by a regenerative torque command from the ECU 30 and generate regenerative braking force in the vehicle 100.

The motor generators MG1 and MG2 are also coupled to the engine 40 via the power division mechanism 41. Then, the motor generators MG1 and MG2 are controlled such that the ratio of driving force generated by the engine 40 and driving force generated by the motor generators MG1 and MG2 becomes optimum. Additionally, one of either the motor generator MG1 or MG2 may exclusively function an electric motor, and the other of either the motor generator MG1 or MG2 may exclusively function as a generator. In the first embodiment, the motor generator MG1 functions as a generator driven by the engine 40, and the motor generator MG2 functions as an electric motor driven by the driving wheels 42.

As the power division mechanism 41, for example, a planetary gear mechanism (planetary gear) is used in order to distribute the power of the engine 40 to both of the driving wheels 42 and the motor generator MG1.

The inverter 14 receives a voltage stepped up from the converter 12, to drive the motor generator MG1 to start, for example, the engine 40. Additionally, the inverter 14 outputs regenerative power generated by the motor generator MG1 to the converter 12 by mechanical power transmitted from the engine 40. At this time, the converter 12 is controlled by the ECU 30 so as to operate as a step-down circuit.

The inverter 14 is provided in parallel between the power line PL2 and the earth wire NL, and includes U-phase upper and lower arms 15, V-phase upper and lower arms 16, and W-phase upper and lower arms 17. The upper and lower arms of each phase are configured from switching elements connected in series between the power line PL2 and the earth wire NL. For example, the U-phase upper and lower arms 15 are configured from switching elements Q3 and Q4, the V-phase upper and lower arms 16 are configured from switching elements Q5 and Q6, and the W-phase upper and lower arms 17 are configured from switching elements Q7 and Q8. Antiparallel diodes D3 to D8 are connected to the switching elements Q3 to Q8, respectively. The switching elements Q3 to Q8 are controlled by a switching control signal PWI from the ECU 30.

For example, the motor generator MG1 is a three-phase permanent magnet synchronous motor, and respective one ends of three U-, V- and W-phase coils are connected to a neutral point in common. Furthermore, the other ends of the respective phase coils are connected to connection nodes of the switching elements of the respective phase upper and lower arms 15 to 17.

The inverter 22 is connected with the converter 12 in parallel with the inverter 14.

The inverter 22 converts a DC voltage output by the converter 12 into a three-phase alternating current, to output the three-phase alternating current to the motor generator MG2 that drives driving wheels 42. The inverter 22 outputs regenerative power generated by the motor generator MG2 to the converter 12 with regenerative braking. At this time, the converter 12 is controlled by the ECU 30 so as to operate as a step-down circuit. An internal configuration of the inverter 22, which is not shown in the drawing, is similar to that of the inverter 14, and detailed description of the internal configuration of the inverter 22 is omitted.

The converter 12 is basically controlled such that the switching elements Q1 and Q2 are complementarily and alternately turned on and off within each switching cycle. The converter 12 steps up the DC voltage VB supplied from the power storage apparatus 28 to a DC voltage VM (this DC voltage corresponding to an input voltage to the inverter 14 is hereinafter referred to as also a "system voltage") in step-up operation. This step-up operation is performed by supplying electromagnetic energy, which is stored in the reactor L1 during the ON period of the switching element Q2, to the power line PL2 via the switching element Q1 and the antiparallel diodes D1.

The converter 12 steps down the DC voltage VM to the DC voltage VB in step-down operation. This step-down operation is performed by supplying electromagnetic energy, which is stored in the reactor L1 during the ON period of the switching element Q1, to the earth wire NL via the switching element Q2 and the antiparallel diodes D2.

A voltage conversion ratio of these step-up operation and step-down operation (ratio of VM and VB) is controlled by an ON period ratio (duty ratio) of the switching elements Q1 and Q2 in the aforementioned switching cycle. The switching elements Q1 and Q2 are fixed to be turned on and off, respectively, thereby enabling VM=VB (voltage conversion ratio=1.0) to be established.

The smoothing capacitor C2 smoothes a DC voltage from the converter 12, to supply the smoothed DC voltage to the inverter 23. The voltage sensor 13 detects a voltage on the both ends of the smoothing capacitor C2, namely a system voltage VM, to output the detection value of the system voltage VM to the ECU 30.

In a case where a torque command value of the motor generator MG1 is positive (TR1>0), the inverter 14 drives the motor generator MG1 so as to convert a DC voltage into an AC voltage by the switching operation of the switching elements Q3 to Q8 in response to the switching control signal PWI1 from the ECU 30 when the DC voltage is supplied from the smoothing capacitor C2, and so as to output positive torque. In a case where the torque command value of the motor generator MG1 is 0 (TR1=0), the inverter 14 drives the motor generator MG1 so as to convert the DC voltage into the AC voltage by the switching operation in response to the switching control signal PWI1, and so as to make the torque 0. Consequently, the motor generator MG1 is driven so as to generate 0 or positive torque designated by the torque command value TR1.

Furthermore, at the time of the regenerative braking of the vehicle 100, the torque command value TR1 of the motor generator MG1 is set to be negative (TR1<0). In this case, the inverter 14 converts an AC voltage generated by the motor generator MG1 into a DC voltage by the switching operation in response to the switching control signal PWI1, to supply the converted DC voltage (system voltage) to the converter 12 via the smoothing capacitor C2. The regenerative braking mentioned herein includes braking accompanied by regenerative power generation in a case where a foot brake is operated by a driver that drives an electrically driven vehicle, and deceleration (or stop of acceleration) of a vehicle while generating regenerative power by release of an accelerator pedal during traveling without operating a foot brake.

Similarly, the inverter 22 drives the motor generator MG2 so as to convert a DC voltage into an AC voltage to obtain predetermined torque, by switching operation in response to a switching control signal PW2 received from the ECU 30, corresponding to a torque command value of the motor generator MG2.

Current sensors 24 and 25 detect motor currents MCRT1 and MCRT2 that flow through the motor generators MG1 and MG2 respectively, to output the detected motor currents to the ECU 30. The sum of respective current instantaneous values of U-phase, V-phase and W-phase is zero, and therefore it is sufficient to arrange the current sensors 24 and 25 such that the current sensors detect motor currents of two phases, as shown in FIG. 1.

Rotation angle sensors (resolvers) 26 and 27 detect the rotation angles $\theta 1$ and $\theta 2$ of the motor generators MG1 and MG2 respectively, to output the detected rotation angles $\theta 1$ and $\theta 2$ to the ECU 30. The ECU 30 can compute the rotational speeds MRN1 and MRN2 and the angular velocities $\omega 1$ and $\omega 2$ (rad/s) of the motor generators MG1 and MG2 on the basis of the rotation angles $\theta 1$ and $\theta 2$. The angle sensors 26 and 27 may not be arranged by causing the ECU 30 to directly compute the rotation angles $\theta 1$ and $\theta 2$ from motor voltages or currents.

The ECU 30 is an example of a "control apparatus for a voltage conversion apparatus" in the invention, includes a CPU, a storage apparatus, and an input/output buffer, all of which are not shown in the drawing, and controls each apparatus of the vehicle 100. This control is not limited to a process performed by software, and can be performed by a process built by dedicated hardware (electronic circuit).

As a representative function, the ECU 30 controls the operation of the converter 12 and the inverter 23 on the basis of the input torque command values TR1 and TR2, the DC voltage VB detected by the voltage sensor 10, the DC current IB detected by the current sensor 11, the system voltage VM detected by the voltage sensor 13, the motor currents MCRT1 and MCRT2 from the current sensors 24 and 25, and the rotation angles $\theta 1$ and $\theta 2$ from the rotation angle sensors 26 and 27, and the like such that the motor generators MG1 and MG2 output toque according to the torque command value TR1 and toque according to the torque command value TR2, respectively. That is, the ECU 30 generates the switching control signals PWC, PWI1 and PWI2 for controlling the converter 12 and inverter 23 as described above, to output the generated switching control signals to the converter 12 and the inverter 23.

In the step-up operation of the converter 12, the ECU 30 generates the switching control signal PWC such that the system voltage VM coincides with a voltage command value, by the feedback control of the system voltage VM.

When the vehicle 100 enters a regenerative braking mode, the ECU 30 generates the switching control signals PWI1 and PWI2 so as to convert an AC voltage generated by the motor generators MG1 and MG2 into a DC voltage, and outputs the generated switching control signals to the inverter 23. Consequently, the inverter 23 converts the AC voltage generated by the motor generators MG1 and MG2 into a DC voltage, to supply the converted DC voltage to the converter 12.

Furthermore, when the vehicle 100 enters the regenerative braking mode, the ECU 30 generates the switching control signal PWC so as to step down the DC voltage supplied from the inverter 23, and outputs the generated switching control signal to the converter 12. Consequently, the AC voltage generated by the motor generators MG1 and MG2 is converted into a DC voltage, further stepped down, and supplied to the power storage apparatus 28.

Figure 2:
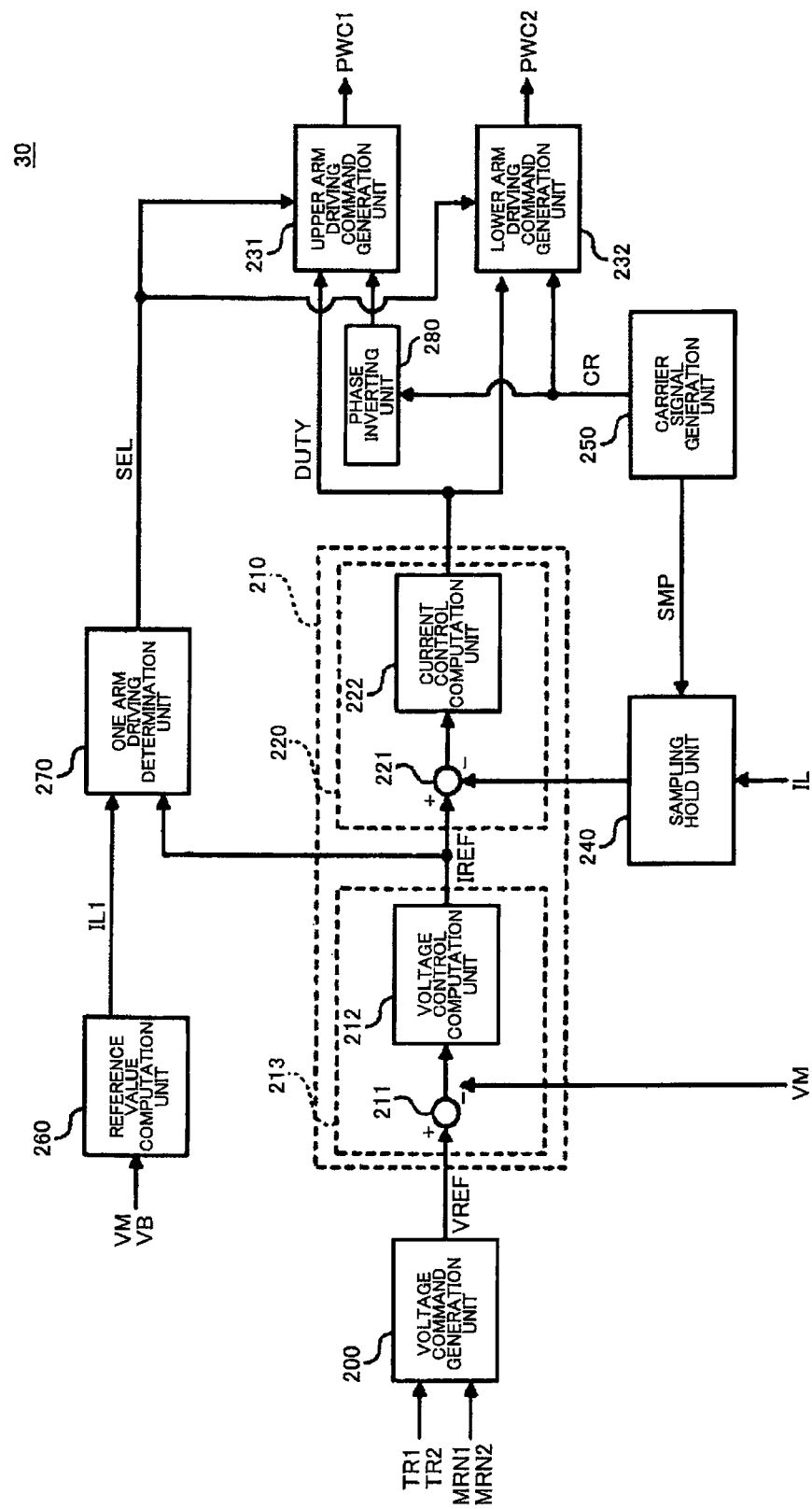
FIG. 2 is a block diagram showing a configuration of an ECU according to the first embodiment.

A specific configuration of the ECU 30 that is the control apparatus for a voltage conversion apparatus according to the first embodiment will be now described with reference to FIG. 2. FIG. 2 is a block diagram showing a configuration of the ECU according to the first embodiment.

In FIG. 2, the ECU 30 according to the first embodiment includes a voltage command generation unit 200, a voltage control unit 210, an upper arm driving command generation unit 231, a lower arm driving command generation unit 232, a sampling hold unit 240, a carrier signal generation unit 250, a reference value computation unit 260, a one arm driving determination unit 270, and a phase inverting unit 280.

The voltage command generation unit 200 receives the input of the torque command value TR1 and the torque command value TR2 to the motor generators MG1 and MG2, and the rotational speeds MRN1 and MRN2 of the motor generators MG1 and MG2. Then, the voltage command generation unit 200 generates a voltage command VREF of the output voltage of the converter 12 (i.e., input voltage of the inverter 14) on the basis of these pieces of information.

The voltage control unit 210 is an example of "duty command signal generation means" in the invention, and includes a current command generation unit 213 having a subtraction unit 211 and a voltage control computation unit 212, and a current control unit 220 having a subtraction unit 221 and a current control computation unit 222.

The subtraction unit 211 in the current command generation unit 213 computes a voltage deviation between the voltage command VREF received from the voltage command generation unit 200, and a feedback value VM of the system voltage of the converter 12, which is detected by the voltage sensor 13, to output the result of the computation to the voltage control computation unit 212.

The voltage control computation unit 212 computes a reactor current command value ILREF that flows through the reactor L1, by the P1 computation of the voltage deviation computed by the subtraction unit 211.

Thus, in the current command generation unit 213, the reactor current command value ILREF is computed by performing the feedback control of the system voltage of the converter 12.

Then, the voltage control computation unit 212 outputs this reactor current command value ILREF to the current control unit 220 and the one arm driving determination unit 270.

The subtraction unit 221 in the current control unit 220 computes a current deviation between the reactor current command value ILREF from the voltage control computation unit 212, and a feedback value of a reactor current IL in which a detection value is held for each switching cycle by the sampling hold unit 240, to output the result of the computation to the current control computation unit 222.

The current control computation unit 222 computes duties DUTY of the switching elements Q1 and Q2 by the PI computation of the current deviation computed by the subtraction unit 221. In a case where the one arm driving control of the switching element Q1 or Q2 is selected by a selection flag SEL from the one arm driving determination unit 270 described later, the current control computation unit 222 computes duties DUTY such that the reactor current command value ILREF is output, only by the selected switching element.

The upper arm driving command generation unit 231 and the lower arm driving command generation unit 232 are an example of "switching control signal generation mean" in the invention, and generates the switching control signal PWC of controlling the turning-on/off of the switching elements Q1 and Q2 of the upper and lower arms of each phase of the converter 12, on the basis of comparison between the duties DUTY from the current control computation unit 222, and carrier waves CR from the carrier signal generation unit 250 and the phase inverting unit 280. At this time, the upper arm driving command generation unit 231 and the lower arm driving command generation unit 232 select the switching elements Q1 or Q2 to be driven, in accordance with the selection flag SEL from the one arm driving determination unit 270.

In a case where the motor generators MG1 and MG2 are in a powering state, an output voltage from the power storage apparatus 28 is stepped up to a desired input voltage of the inverter 23 by this switching control signal PWC. In a case where the motor generators MG1 and MG2 are in a regeneration state, power generated by the motor generators MG1 and MG2 and converted into DC by the inverter 23 is stepped down to a voltage that can be charged by the power storage apparatus 28.

The carrier signal generation unit 250 is an example of "carrier signal generation mean" in the invention, and outputs a carrier signal CR of a predetermined carrier frequency to the lower arm driving command generation unit 232 and the phase inverting unit 280. Additionally, the carrier signal generation unit 250 outputs a sampling signal SMP to the sampling hold unit 240 every cycle of the carrier signal CR. The sampling hold unit 240 detects and holds the reactor current IL detected by the current sensor 18 at the time of the input of each sampling signal SMP, to output the detected current to the subtraction unit 221.

The reference value computation unit 260 receives the input of the output voltage VB of the power storage apparatus 28, and the system voltage VM. Then, the reference value computation unit 260 computes a current reference value IL1, in which the direction of the reactor current IL is switched from positive to negative, or from negative to positive in one cycle of the carrier waves CR, from these pieces of information, to output the computed current reference value to the one arm driving determination unit 270.

The one arm driving determination unit 270 receives the input of the reactor current command value ILREF from the voltage control computation unit 212, and the current reference value IL1 from the reference value computation unit 260. The one arm driving determination unit 270 selects the switching element to be driven, on the basis of these pieces of information. Then, the one arm driving determination unit 270 outputs the selection flag SEL, which is the selected result, to the upper arm driving command generation unit 231 and the lower arm driving command generation unit 232.

The phase inverting unit 280 is an example of "phase inverting means" in the invention, and inverts the phase of the carrier signal output from the carrier signal generation unit 250, to output the inverted carrier signal to the upper arm driving command generation unit 231. Consequently, the carrier signal input to the upper arm driving command generation unit 231, and the carrier signal input to the lower arm driving command generation unit 232 are shifted in phase from each other by 180 degrees. The effect of the shift of the phases of the carrier signals CR will be later described.

The ECU 30 that includes the aforementioned units is an integrally configured electronic control unit, and all operation according to the aforementioned each unit is executed by the ECU 30. However, physical, mechanical, and electrical configurations of the aforementioned units according to the invention are not limited to this. For example, these units may be configured as a plurality of ECUs, various processing units, various controllers, or various computer systems such as microcomputer devices.

Figure 3:
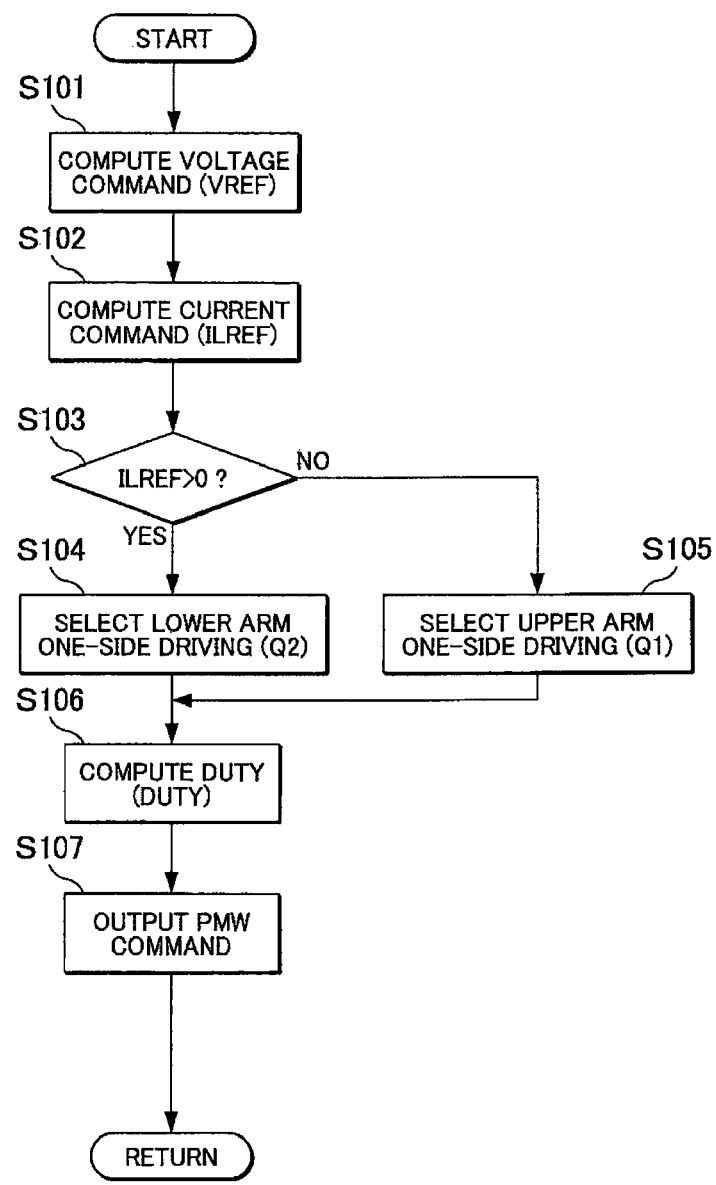
FIG. 3 is a flowchart showing the operation of the control apparatus for a voltage conversion apparatus according to the first embodiment.

The operation of the control apparatus for a voltage conversion apparatus according to the first embodiment will be now described with reference to FIG. 3. FIG. 3 is a flowchart showing the operation of the control apparatus for a voltage conversion apparatus according to the first embodiment. Each of steps in the flowchart in FIG. 3 is implemented by execution of a program, which is previously stored in the ECU 30, in a predetermined cycle. Alternatively, a part of the steps can be implemented by building dedicated hardware (electronic circuit).

In FIG. 3, in the operation of the control apparatus for a voltage conversion apparatus according to the first embodiment, the ECU 30 computes a voltage command VREF by the voltage command generation unit 200 (Step S101).

Then, the ECU 30 computes a reactor current command value ILREF by the voltage control computation unit 212 (Step S102).

Next, the ECU 30 determines whether or not the reactor current command value ILREF is positive, namely whether or not the motor generators MG1 and MG2 are controlled in a powering state (Step S103).

In a case where the reactor current command value ILREF is positive (Step S103: YES), the ECU 30 makes setting so as to perform the one arm driving control of the switching element Q2 that is a lower arm, with the one arm driving determination unit 270 (Step S104).

On the other hand, in case where the reactor current command value ILREF is zero of negative (Step S103: NO), the motor generators MG1 and MG2 are controlled in a regeneration state, and therefore the ECU 30 makes setting so as to perform the one arm driving control of the switching element Q1 that is an upper arm (Step S105). In a case where the reactor current command value ILREF is zero, the converter 12 does not convert a voltage, and therefore the upper and lower arms are not actually driven.

Next, the ECU 30 computes duties DUTY of the switching elements Q1 and Q2 with the current control computation unit 222 on the basis of the driving arm set in Step S104 or Step S105, and the reactor current command value ILREF (Step S106).

Then, the ECU 30 generates switching control signals PWC1 and PWC2 of driving the switching elements Q1 and Q2 of the converter 12 with the upper arm driving command generation unit 231 and the lower arm driving command generation unit 232, on the basis of comparison between the duties DUTY of the switching elements Q1 and Q2 and the carrier signal CR, to output the switching control signals PWC1 and PWC2 to the converter 12.

The converter 12 is controlled in accordance with the switching control signal PWC generated through the aforementioned processes, thereby executing the control such that only the lower arm (switching element Q2) is driven in the case where the motor generators MG1 and MG2 are in the powering state, and such that only the upper arm (switching element Q1) is driven in the case where the motor generators MG1 and MG2 are in the regeneration state.

Figure 4:
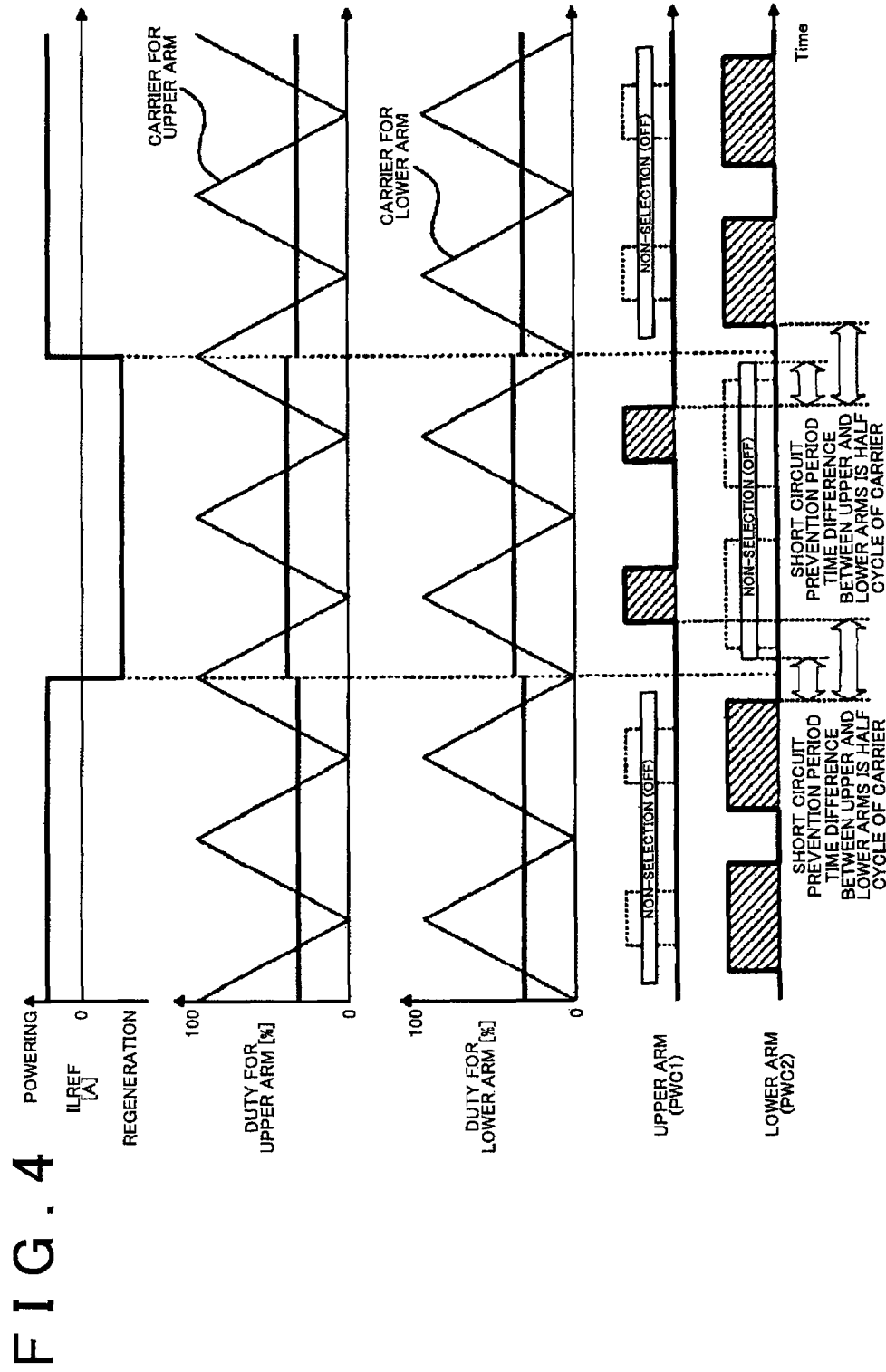
FIG. 4 is a timing chart showing the changes of various parameters in the operation of the control apparatus for a voltage conversion apparatus according to the first embodiment.
Figure 5:
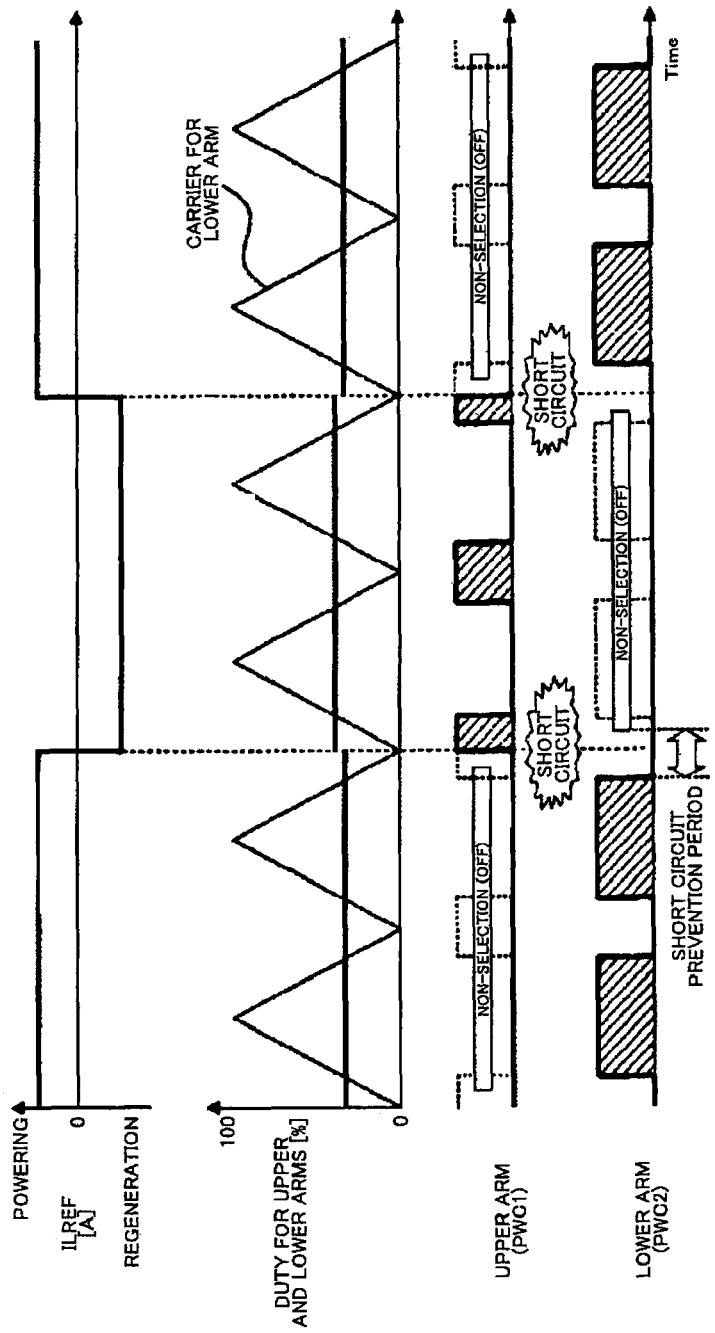
FIG. 5 is a timing chart showing the changes of various parameters in the operation of a control apparatus for a voltage conversion apparatus according to a comparative example.

Hereinafter, the operation of the control apparatus for a voltage conversion apparatus, described above, will be more specifically described with reference to FIGS. 4 and 5. FIG. 4 is a timing chart showing the changes of various parameters in the operation of the control apparatus for a voltage conversion apparatus according to the first embodiment. FIG. 5 is a timing chart showing the changes of various parameters in the operation of a control apparatus for a voltage conversion apparatus according to a comparative example.

In FIG. 4, as to carrier signals input to the upper arm driving command generation unit 231 and the lower arm driving command generation unit 232, the phase of one of the carrier signals, which corresponds to the upper arm driving command generation unit 231, is inverted by the phase inverting unit 280, and therefore, the phases of the carrier signals are shifted from each other by 180 degrees.

Herein, as shown in the drawing, control, in which the motor generators MG1 and MG2 first perform powering operation, then perform regenerative operation, and finally perform powering operation again, will be considered.

In a case where the motor generators MG1 and MG2 perform powering operation, the switching elements Q1 and Q2 are turned off and on respectively, to perform one arm driving by the lower arm (hereinafter, suitably referred to as "lower arm driving"). Therefore, the switching control signal PWC2 corresponding to the switching element Q2 is output in matching with the timing of the carrier signal for the lower arm (i.e., carrier signal that is not inverted).

On the other hand, in a case where the motor generators MG1 and MG2 perform regenerative operation, the switching elements Q1 and Q2 are turned on and off respectively, to perform one arm driving by the upper arm (hereinafter, suitably referred to as "upper arm driving"). Therefore, the switching control signal PWC1 corresponding to the switching element Q1 is output in matching with the timing of the carrier signal for the upper arm (i.e., carrier signal that is inverted).

Particularly, at the time of the switching from the lower arm driving to the upper arm driving, the switching element Q2 that is in an ON state is first turned off, and the switching element Q1 is in an OFF state is then turned on. At this time, when a period from when the switching element Q2 is turned off to when the switching element Q1 is turned on is shortened, the switching elements Q1 and Q2 may be short-circuited with each other. Particularly, in a switching element configured as a semiconductor device, a delay occurs in the turning-on/off of an actual current from the reception of the switching control signal PWC, and therefore a high risk for short circuit exists. Herein, a period to be spaced for preventing, such a short circuit is shown as a short circuit prevention period in the drawing.

In the control apparatus for a voltage conversion apparatus according to the first embodiment, as described above, the phases of the carrier signals input to the upper arm driving command generation unit 231 and the lower arm driving command generation unit 232 are shifted from each other by 180 degrees. Therefore, the period from when the switching element Q2 is turned off to when the switching element Q1 is turned on is secured by a half cycle of the carrier signal CR.

A case where the phase of the carrier signal CR is not inverted, unlikely to the control apparatus for a voltage conversion apparatus according to the first embodiment, is considered.

In FIG. 5, in the control apparatus for a voltage conversion apparatus according to a comparative example, the phases of carrier signals input to the upper arm driving command generation unit 231 and the lower arm driving command generation unit 232 are not inverted from each other, and carrier signals common with each other are input to the upper arm driving command generation unit 231 and the lower arm driving command generation unit 232. In such a case, when switching from the lower arm driving to the upper arm driving is performed, the switching element Q1 is turned on in an relatively early stage since the switching element Q2 is turned off, resulting in a possibility that the switching elements Q1 and Q2 are short-circuited with each other.

On the contrary, in the control apparatus for a voltage conversion apparatus according to the first embodiment, as described above, the phase of the carrier signal is inverted, a period of a half cycle of the carrier signal can be secured as the period from when the switching element Q2 is turned off to when the switching element Q1 is turned on. As apparent from FIG. 4, the period of a half cycle of the carrier signal is sufficiently longer than the short circuit prevention period. Therefore, according to the control apparatus for a voltage conversion apparatus according to the first embodiment, it is possible to reliably prevent the short circuit of the switching elements Q1 and Q2.

As a method of preventing the short circuit described above, a method of adding dead time (i.e., period during which both switching elements Q1 and Q2 are turned off) is considered. However, in this case, a maximum step-up ratio in the converter 12 is restricted by the dead time. Particularly, in a case where the driving frequency of the converter 12 is made high, the influence of the dead time on the maximum step-up ratio is also increased.

On the contrary, in the control apparatus for a voltage conversion apparatus according to the first embodiment, it is possible to prevent short circuit without adding the dead time, and therefore it is possible to effectively suppress reduction in the maximum step-up ratio in the converter 12.

The aforementioned description covers only a case where the powering operation is switched to the regenerative operation (i.e., the lower arm driving is switched to the upper arm driving). However, as apparent from FIG. 4, a similar effect is obtained also in a case where the regenerative operation is switched to the powering operation (i.e., the upper arm driving is switched to the lower arm driving). Specifically, a period from when the switching element Q1 is turned off to when the switching element Q2 is turned on is secured by a half cycle of the carrier signal, and therefore it is possible to reliably prevent the short circuit of the switching elements Q1 and Q2.

As described above, according to the control apparatus for a voltage conversion apparatus according to the first embodiment, the phases of the respective carrier signals corresponding to the switching elements Q1 and Q2 are shifted from each other by 180 degrees, and therefore a period of a half cycle of the carrier signal can be secured as a period from when one of the switching elements. Q1 and Q2 is turned off to when the other is turned on. Accordingly, it is possible to suitably prevent the short circuit of the switching elements Q1 and Q2 in the upper and lower arms without reducing the step-up ratio in the converter 12.

Second Embodiment

A control apparatus for a voltage conversion apparatus according to a second embodiment will be now described. The second embodiment is different from the aforementioned first embodiment only in a part of the configuration or the operation, and other parts of the second embodiment are mostly similar to those of the first embodiment. Therefore, different parts from those of the first embodiment are hereinafter described in detail, and description of other overlapped parts is properly omitted.

Figure 6:
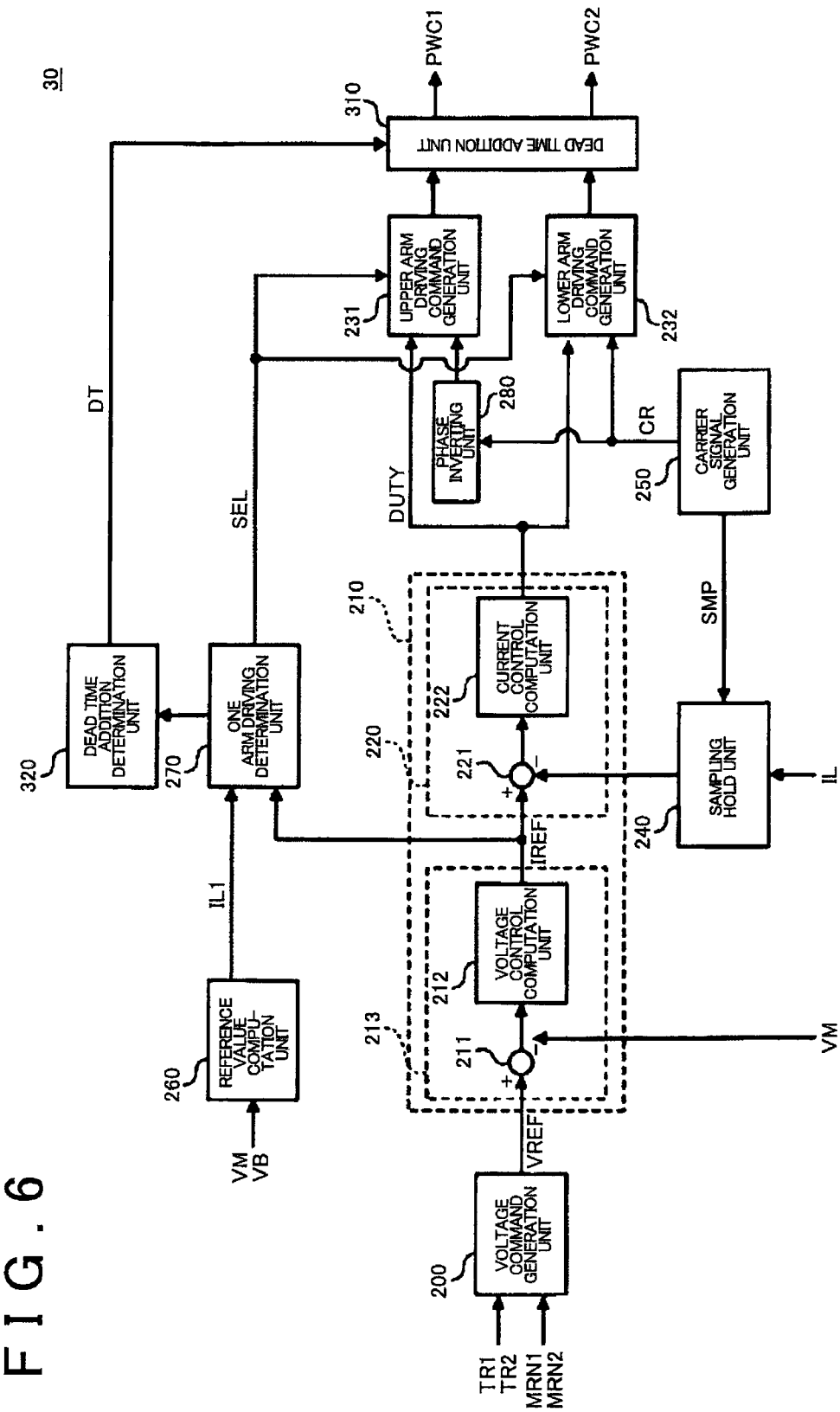
FIG. 6 is a block diagram showing a configuration of an ECU according to a second embodiment.

First, a specific configuration of an ECU 30 that is a control apparatus for the voltage conversion apparatus according to the second embodiment will be described with reference to FIG. 6. FIG. 6 is a block diagram showing a configuration of the ECU according to the second embodiment.

In FIG. 6, the ECU 30 according to the second embodiment includes a dead time addition unit 310, and a dead time addition determination unit 320, in addition to respective units included in the ECU 30 according to the first embodiment (see FIG. 2).

The dead time addition unit 310 is an example of "dead time addition means" in the invention, and is capable of adding dead time to switching control signals PWC1 and PWC2 output from an upper arm driving command generation unit 231 and a lower arm driving command generation unit 232, and outputting the switching control signals PWC1 and PWC2 added with the dead time.

The dead time addition determination unit 320 is an example of "dead time addition determination means" in the invention, and controls the dead time addition unit 310 by a dead time control signal DT such that the dead time is added only to switching right after arm switching. Additionally, the dead time addition determination unit 320 may have such a function as to adjust the length of the dead time that the dead time addition unit 310 adds. That is, the dead time addition determination unit 320 may function as an example of "dead time adjustment means" in the invention.

Figure 7:
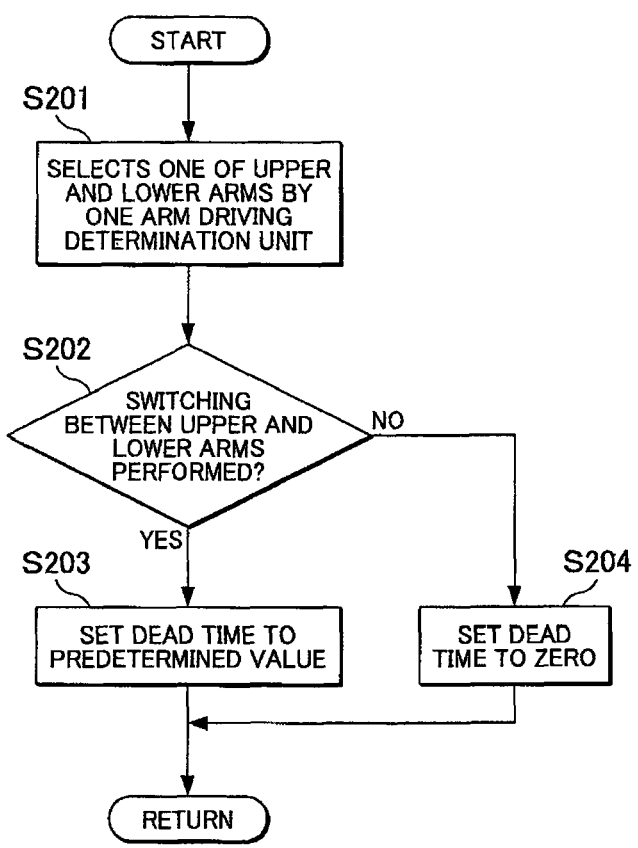
FIG. 7 is a flowchart showing the operation of the control apparatus for a voltage conversion apparatus according to the second embodiment.

The operation of the control apparatus, for a voltage conversion apparatus according to the second embodiment will be now described with reference to FIG. 7. FIG. 7 is a flowchart showing the operation of the control apparatus for a voltage conversion apparatus according to the second embodiment. In FIG. 7, a part of the processes of the control apparatus for a voltage conversion apparatus shown in FIG. 3 is omitted, and a process related to the addition of the dead time peculiar to the second embodiment will be hereinafter described in detail.

In FIG. 7, in the operation of the control apparatus for a voltage conversion apparatus according to the second embodiment, when a one arm driving determination unit 270 selects one of upper and lower arms (in other words, any one of switching elements Q1 and Q2) to perform one arm driving (Step S201), the dead time addition determination unit 320 determines whether or not switching between the upper and lower arms is performed (Step S202). More specifically, the dead time addition determination unit 320 determines whether the switching is performed at switching timing from the upper arm driving to the lower arm driving, or switching timing from the lower arm driving to the upper arm driving is performed.

In a case where the switching between the upper and lower arms is performed is determined (Step S202: YES), the dead time addition determination unit 320 sets the length of the dead time to a predetermined value (Step S203). Consequently, in the dead time addition unit 310, dead time that has the length of the predetermined value is added.

On the other hand, in a case where the switching between the upper and lower arms is not performed is determined (Step S202: NO), the dead time addition determination unit 320 sets the length of the dead time to zero (Step S204). Consequently, in the dead time addition unit 310, the dead time is not added.

According to the control described above, the dead time is added only to the switching control right after arm switching. That is, the dead time is added not to all switching control, but to only switching control that may cause the short circuit of the switching elements Q1 and Q2.

The dead time has an effect of preventing short circuit as described above, but also has an effect of reducing a maximum step-up ratio in a converter 12. Therefore, it is possible to more effectively prevent short circuit by adding the dead time only at the timing of preventing short circuit.

The dead time addition determination unit 320 may be capable of adjusting the length of the dead time, as described above. That is, the predetermined value in Step S203 may be changeable. The longer the dead time is, the more reliably the short circuit of the switching elements can be prevented. On the other hand, the shorter the dead time is, the more greatly the reduction of the maximum step-up ratio in the converter 12 can be suppressed. Accordingly, by proper adjustment of the length of the dead time, it is possible to suppress the reduction of the maximum step-up ratio in the converter 12 while reliably preventing the short circuit of the switching elements Q1 and Q2.

The dead time addition determination unit 320 may adjust the length of the dead time, for example, on the basis of a duty ratio or an input voltage Vm to the converter 12.

As described above, according to the control apparatus for a voltage conversion apparatus according to the second embodiment, by the addition of the dead time, it is possible to effectively suppress the reduction of the maximum step-up ratio in the converter 12 resulting from the addition of the dead time, while further reliably preventing the short circuit of the switching elements Q1 and Q2 compared to the first embodiment.

The invention is not limited to the aforementioned embodiments, but various changes may be appropriately made, if desired, without departing from the essence or spirit of the invention which can be read from the claims and the entire specification. A control apparatus and a control method for a voltage conversion apparatus, which involve such changes, are also intended to be within the technical scope of the invention.

12 CONVERTER
20 DC VOLTAGE GENERATION UNIT
22, 23 INVERTER
28 POWER STORAGE APPARATUS
30, ECU
40 ENGINE
41 POWER DIVISION MECHANISM
42 DRIVING WHEELS
45 LOADING APPARATUS
100 VEHICLE
200 VOLTAGE COMMAND GENERATION UNIT
210 VOLTAGE CONTROL UNIT
211 SUBTRACTION UNIT
212 VOLTAGE CONTROL COMPUTATION UNIT
213 CURRENT COMMAND GENERATION UNIT
220 CURRENT CONTROL UNIT
221 SUBTRACTION UNIT
222 CURRENT CONTROL COMPUTATION UNIT
231 UPPER ARM DRIVING COMMAND GENERATION UNIT
232 LOWER ARM DRIVING COMMAND GENERATION UNIT
240 SAMPLING HOLD UNIT
250 CARRIER SIGNAL GENERATION UNIT
260 REFERENCE VALUE COMPUTATION UNIT
270 ONE ARM DRIVING DETERMINATION UNIT
280 PHASE INVERTING UNIT
310 DEAD TIME ADDITION UNIT
320 DEAD TIME ADDITION DETERMINATION UNIT
C2 SMOOTHING CAPACITOR
D1, D2 DIODE
L1 REACTOR
MG1, MG2 MOTOR GENERATOR
Q1, Q2 SWITCHING ELEMENT
SR1, SR2 SYSTEM RELAY

The invention claimed is:

1. A control apparatus for a voltage conversion apparatus including a first switching element and a second switching element connected in series with each other, the control apparatus comprising:
    a controller configured to generate a duty command signal corresponding to a duty ratio of the first switching element and the second switching element,
    the controller being configured to generate carrier signals corresponding to respective switching frequencies of the first switching element and the second switching element,
    the controller being configured to generate respective switching control signals of switching ON and OFF states of the first switching element and ON and OFF states of the second switching element, by comparing the duty command signal with the carrier signals,
    the controller being configured to implement one arm driving only by any one of a first arm including the first switching element and a second arm including the second switching element, by alternatively turning on the first switching element and the second switching element such that the first switching element and the second switching element are alternatively turned on, and
    the controller being configured to bring portion of phases, of the carrier signals, corresponding to switching of the first switching element or the second switching element at least right after arm switching, into a state where the phases are shifted from each other by 180 degrees between the first switching element and these second switching element, at a time of the arm switching of mutually switching between one arm driving by the first arm and one arm driving by the second arm.

2. The control apparatus for a voltage conversion apparatus according to claim 1, wherein
    the controller brings the phases of the carrier signals into a state where the phases of the carrier signals are always shifted from each other by 180 degrees between the first switching element and the second switching element.

3. The control apparatus according to claim 1 wherein:
    the controller adds dead time during which both the first switching element and the second switching element are turned off, to the switching control signals; and
    the controller adds the dead time to only switching of the first switching element or the second switching element right after the arm switching.

4. The control apparatus for a voltage conversion apparatus according to claim 3, wherein:
    the controller adjusts a length of the dead time on the basis of the duty ratio of the first switching element and the second switching element.

5. A control method for a voltage conversion apparatus including a first switching element and a second switching element connected in a series with each other, the control method comprising:
- generating a duty command signal corresponding to a duty ratio of the first switching element and the second switching element;
- generating carrier signals corresponding to respective switching frequencies of the first switching element and the second switching element;
- generating respective switching control signals of switching ON and OFF states of the first switching element and ON and OFF states of the second switching element, by comparing the duty command signal with the carrier signals;
- implementing one arm driving only by any one of a first arm including the first switching element and a second arm including a second switching element, by generating the switching control signals such that the first switching element and the second switching element are alternatively turned on; and
- bringing portions of phases, of the carrier signals, corresponding to switching of the first switching element or the second switching element at least right after arm switching, into a state where the phases are shifted from each other 180 degrees between the first switching element and the second switching element, at a time of the arm switching of mutually switching between one arm driving by the first arm and one arm driving by the second arm.

* * * * *